(12) United States Patent
Weichselbaum

(10) Patent No.: US 9,430,868 B2
(45) Date of Patent: Aug. 30, 2016

(54) PSEUDO 3-D RENDERING OF MOBILE DEVICE BASED SLOT MACHINE

(71) Applicant: TAP SLOTS INC., Las Vegas, NV (US)

(72) Inventor: Markus Weichselbaum, Las Vegas, NV (US)

(73) Assignee: TAP SLOTS INC., Las Vegas, NV (US)

( * ) Notice: Subject to any disclaimer, the term of this patent is extended or adjusted under 35 U.S.C. 154(b) by 0 days.

(21) Appl. No.: 14/624,283

(22) Filed: Feb. 17, 2015

(65) Prior Publication Data

US 2015/0325042 A1 Nov. 12, 2015

Related U.S. Application Data

(63) Continuation of application No. 14/242,172, filed on Apr. 1, 2014, now Pat. No. 8,957,897.

(51) Int. Cl.
| | |
|---|---|
| *G06T 15/60* | (2006.01) |
| *G06T 15/00* | (2011.01) |
| *G06F 3/048* | (2013.01) |
| *G06T 15/50* | (2011.01) |
| *G06F 3/00* | (2006.01) |
| *G07F 17/32* | (2006.01) |

(52) U.S. Cl.
CPC ............ *G06T 15/60* (2013.01); *G06F 3/00* (2013.01); *G06F 3/048* (2013.01); *G06T 15/005* (2013.01); *G06T 15/50* (2013.01); *G07F 17/32* (2013.01); *G06F 2200/1614* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 5,934,672 | A | 8/1999 | Sines et al. |
| 6,388,688 | B1 | 5/2002 | Schileru-Key |
| 2002/0140666 | A1 | 10/2002 | Bradski |
| 2003/0063772 | A1 | 4/2003 | Smith et al. |
| 2008/0034321 | A1 | 2/2008 | Griffin |
| 2011/0045906 | A1 | 2/2011 | Berman et al. |
| 2011/0083103 | A1 | 4/2011 | Shim et al. |

*Primary Examiner* — James A Thompson
(74) *Attorney, Agent, or Firm* — Pillsbury Winthrop Shaw Pittman LLP

(57) ABSTRACT

The invention relates to a system and method for applying one or more visual effects such as three-dimensional effects and holographic effects to one or more two-dimensional images that represent all or a portion of a virtual slot machine that is depicted in a virtual slot machine game rendered by a computing device. The computing device may determine the visual effects to be applied based on sensor information that indicates an orientation of the computing device. The visual effects may simulate various real-world visual changes (e.g., shadow changes, reflection changes, etc.) that occur as the user's point of view changes, thereby providing a more realistic user experience in relation to the virtual slot machine game.

19 Claims, 9 Drawing Sheets

PSEUDO 3-D RENDERING OF MOBILE DEVICE BASED SLOT MACHINE

CROSS REFERENCE TO RELATED APPLICATION

This application is a continuation of U.S. patent application Ser. No. 14/242,172 filed Apr. 1, 2014 (issued on Feb. 17, 2015 as U.S. Pat. No. 8,957,897), the entirety of which is incorporated herein by reference.

FIELD OF THE INVENTION

The invention relates to a system and method for applying visual effects such as three-dimensional and holographic effects to two-dimensional images in a slot machine game rendered on a mobile device based on sensor information that indicates an orientation of the mobile device.

BACKGROUND OF THE INVENTION

Techniques for providing three-dimensional game experiences are known. However, rendering three-dimensional images can be a cumbersome experience and a computationally intensive process. For example, some three-dimensional displays require specific hardware, such as special viewing glasses to be worn by the user. In other systems, the quantity of data that has to be stored a id processed in order to generate a three-dimensional image is particularly extensive. Still others require complex modeling. Two-dimensional displays are simpler and require less complex processing but are less appealing to some users.

SUMMARY

The invention solves these and other drawbacks of conventional systems. The invention relates to a system and method for applying one or more visual effects such as three-dimensional effects and holographic effects to one or more two-dimensional images that represent all or a portion of a virtual slot machine that is depicted in a virtual slot machine game rendered by a computing device. The computing device may be any type of mobile or otherwise handheld device. The computing device may determine the visual effects to be applied based on sensor information that indicates an orientation of the computing device. In this manner, the orientation of the computing device may serve as a proxy for a Point of View ("POV") of a user that is interacting with a real-world slot machine. In other words, changes to the orientation of the computing device may correlate to changes in the POV of a user that is interacting with a real-world slot machine. Determining and applying the visual effect to the two-dimensional image may therefore simulate various real-world visual changes (e.g., shadow changes, reflection changes, etc.) that occur as the user's POV changes, thereby providing a more realistic user experience in relation to the virtual slot machine game.

To facilitate these and other functions, the computing device may include one or more sensors that generate the sensor information and one or more processors that are programmed by computer program instructions to generate a graphical user interface ("GUI") that depicts the virtual slot machine game and includes the two-dimensional images. The one or more processors may further be programmed to receive the sensor information from the one or more sensors, determine an orientation of the computing device based on the sensor information, and determine the one or more visual effects to apply to the two-dimensional images based on the sensor information.

The processors may be programmed to apply the determined visual effects to a two-dimensional image. For example, the processors may update the GUI such that a visual effect is overlaid onto, incorporated with, or otherwise visually depicted in association with the two-dimensional image to give the two-dimensional image a three-dimensional appearance or other visual effect. In this manner, all or a portion of the virtual slot machine may be depicted to have a three-dimensional or other visual representation to provide a realistic representation of the virtual slot machine based on the applied visual effects.

In some implementations, the processors may be programmed to generate a new visual effect to be applied when the sensor information indicates that the orientation of the computing device has changed since a previous visual effect was applied. In this manner, as the user playing the virtual slot machine game changes an orientation of the computing device, the processors may update the GUI with new or updated visual effects that are applied to the two-dimensional images. These new visual effects may simulate changes to the perspective views of a real-world slot machine that occur when the POV of a real-world user changes, thereby providing a more realistic user experience while playing the virtual slot machine game.

The processors may determine and apply different types of visual effects such as a three-dimensional effect, a holographic effect, and/or other effects that are applied to a two-dimensional image.

The three dimensional effect may include a shadow effect, a reflection effect, and/or other effects that are applied to the two-dimensional image to provide a three-dimensional appearance of the two-dimensional image.

The shadow effect may include a simulated shadow that is cast by the two-dimensional image based on a virtual light source that provides a virtual light and is fixed with respect to the two-dimensional image. The processors may determine a particular orientation of the mobile device and determine the simulated shadow based on the particular orientation. In this manner, the processors may apply different shadow effects to the two-dimensional image based on the orientation of the computing device to simulate a different perspective of a real-world shadow cast by a real-world portion of a real-world slot machine as a POV of a user changes.

A given shadow effect may be associated with one or more shadow parameters that affect the appearance of the shadow effect. The shadow parameters may include, for example, a width, a length, a transparency, an intensity (e.g., level of black or other shadow color), an overall shape, and/or other property of the shadow effect that affects its appearance. The processor may adjust one or more of the shadow parameters to change the appearance of the shadow effect based on the orientation of the computing device.

In some implementations, the virtual light source may cast a virtual light onto a two dimensional image at a particular angle (e.g., at a 45 degree angle from a given side of the two dimensional image). For example, when the device is in a level orientation (e.g., the player is holding the device level with respect to the ground), a virtual light source that casts a virtual light on one side of the two dimensional image may result in a shadow effect that causes a virtual shadow to be displayed on the other side of the two dimensional image, thereby simulating a real-world light source that casts light onto an object from one side. As the device is tilted horizontally, the virtual reels or other two dimensional images that are depicted to be part of a lower level of the virtual slot machine may appear to be moved horizontally in the opposite direction in order to portray a real lower panel. The computing device may be tilted in various degrees of freedom, such as along an x, y and/or z axis relative to a point on the computing device. In some implementations, if the player tilts the device to the right (i.e., rotating the front panel along the y axis, the lower panel content may appear shifted to the left in a manner which corresponds to the desired virtual depth. The virtual depth may be representative of the simulated three dimensional effects.

The reflection effect may include a reflection image that is displayed in association with a two dimensional image to give an appearance that the two dimensional image is reflecting the reflection image, creating a more realistic environment for a player. For example, the reflection image may include an image or representation of a portion of a virtual casino where the virtual slot machine is located. The portion of the virtual casino may be superimposed on or otherwise combined with a two dimensional image of the virtual slot machine to give the appearance that the two dimensional image is reflecting the portion of the virtual casino in a mirror-like manner.

In some implementations, a given reflection effect may be associated with one or more reflection parameters that affect the appearance of the reflection effect. The reflection parameters may include, for example, an image that is to be reflected (e.g., a "reflection"), a portion of the image that is to be reflected, an intensity of the reflection (e.g., a level of brightness of the reflection), a size of the reflection, whether the reflection should be skewed, a level of skewing, and/or other parameters that can be used to alter the appearance of the reflection image.

In some implementations, the two-dimensional image that virtually reflects the reflection image may include a portion or all of what is displayed in the GUI. For example, a two-dimensional image may simulate a reflective frame of a reel cutout and/or other features of the virtual slot machine and the GUI may display other portions of the virtual slot machine that do not virtually reflect the reflection image. In other examples, the two-dimensional image may encompass the entire viewing portion of the GUI such that the reflection image appears to be reflected by the entire viewing portion.

In some implementations, the reflection effects may be altered based on the angle and/or with rotation of the computing device along one or more axes of rotation. In some implementations, for example, the reflection image may be reflected on a portion of the GUI when tilted in one direction, and the reflection image may be reflected on only a portion of the GUI (e.g., the simulated frame) when the computing device is tilted in another different direction.

In some implementations, depending on the angle and/or rotation of the computing device along one or more axes of rotation, the reflection image may be changed to simulate changing perceptions of the reflection. For example, a different portion of the reflection image or a different reflection image that represents a different perspective of the original reflection image may be displayed as the computing device is moved. In this manner, displaying a different portion of the reflection image (or a different reflection image that provides a different perspective of the original reflection image) may simulate changes in a real-world reflection that occurs as the user's view changes (e.g., as a person's head is moved) while playing a real-world slot machine.

The holographic effect may simulate certain holographic treatments that are applied to real-world slot machines. Such holographic treatments can include "flakes," or iridescent portions that may change in color depending on a viewing angle. The holographic effect may include virtual flakes to simulate such treatments. In some implementations, a holographic effect may be associated with one or more holographic parameters that affect an appearance of the holographic effect. The holographic parameters may include, for example, a number of flakes to display, a density of the flakes to display, an intensity of brightness of an individual flake, a shape of an individual flake, a size of an individual flake, and/or any other parameters that can alter the appearance of the holographic effect.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
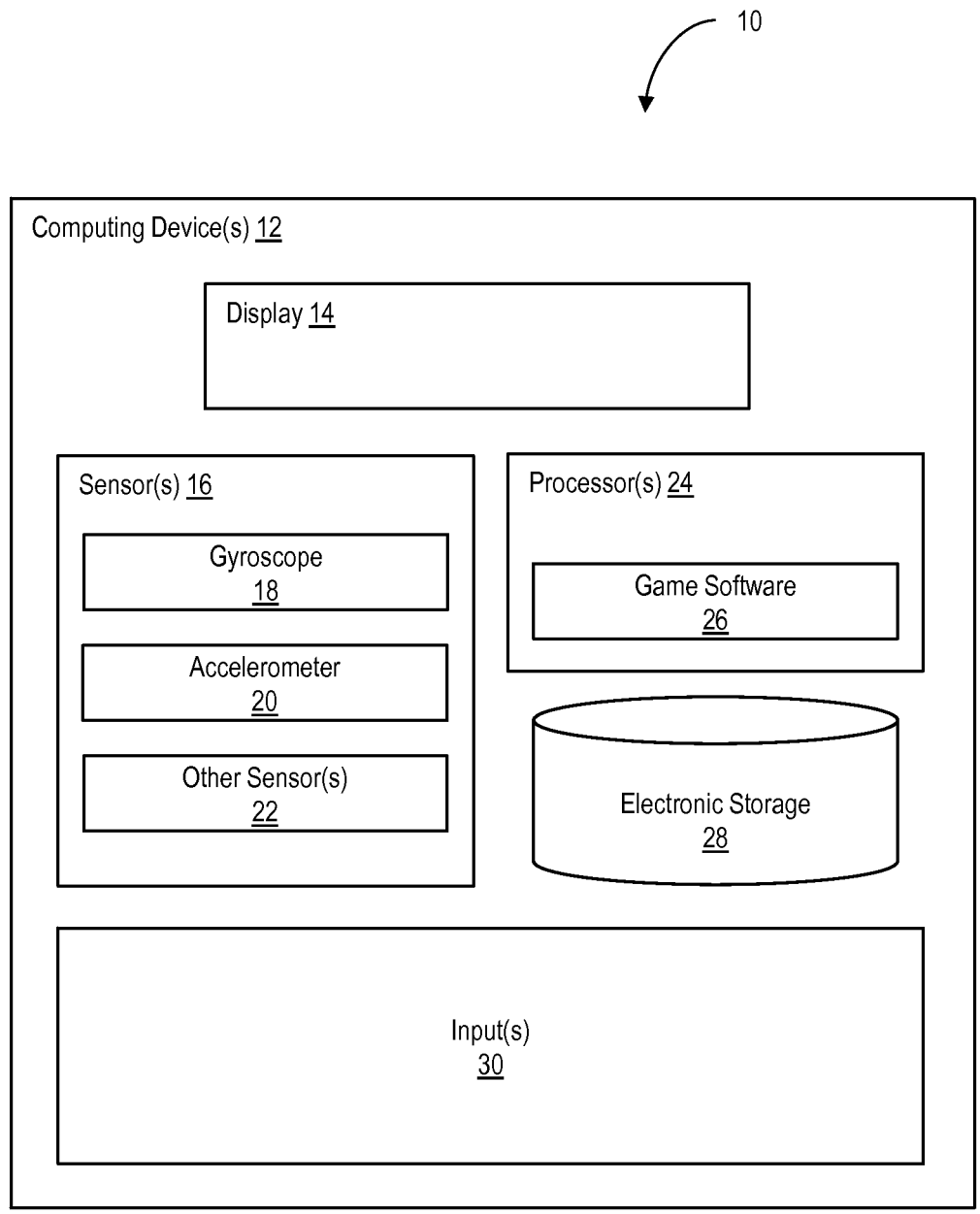
FIG. 1 illustrates an exemplary system configured to apply visual effects such as three-dimensional and holographic effects to two-dimensional images in a slot machine game rendered on a computing device based on sensor information that indicates an orientation of the computing device, according to an aspect of the invention.

FIG. 1 illustrates an exemplary system 10 configured to apply visual effects such as three-dimensional and holographic effects to two-dimensional images in a slot machine game rendered on computing device(s) 12 based on sensor information that indicates an orientation of the computing device(s) 12, according to an aspect of the invention. System 10 may include computing device(s) 12, which may determine the visual effects to be applied based on sensor information that indicates an orientation of computing device(s) 12 used to play the slot machine game. By way of non-limiting example, the given computing device(s) 12 may include one or more of a desktop computer, a laptop computer, a handheld computer, a tablet computing platform, a NetBook, a Smartphone, a gaming console, and/or other computing platforms.

The orientation of the computing device(s) 12 may serve as a proxy for a Point of View ("POV") of a user that is interacting with a real-world slot machine. In other words, changes to the orientation of the computing device(s) 12 may correlate to changes in the POV of a user that is interacting with a real-world slot machine. Determining and applying the visual effect to the two-dimensional image may therefore simulate various real-world visual changes (e.g., shadow changes, reflection changes, etc.) that occur as the user's POV changes, thereby providing a more realistic user experience in relation to the virtual slot machine game. To facilitate these and other functions, the computing device(s) 12 may comprise a display 14, sensor(s) 16, processor(s) 24, electronic storage 28, input(s) 30, and/or other components.

Display 14 may include a touch screen display and/or other type of conventional display that can display the slot machine game and/or receive inputs in relation to the slot machine game. The one or more sensor(s) 16 may determine an orientation, motion, and/or position of computing device(s) 12 and generate sensor information representative of the orientation, motion, and/or position. For example, the sensor(s) 16 may comprise a gyroscope, an accelerometer, a gravity sensor, a rotational vector sensor, a barometer, a photometer, a thermometer, a magnetometer, and/or other sensor(s) that can determine the orientation, motion, and/or position of computing device (12).

The one or more processors 24 may be programmed by computer program instructions, such as game software 26, to receive and process the sensor information, which may include information from one or more of the sensors (16) (including a combination of different types of sensors) to determine an orientation, motion, and/or position of the computing device(s) 12.

The computer program instructions may be configured to enable a player associated with the given computing device(s) 12 to interface with system 10, game server(s) (not illustrated in FIG. 1) that serve content to computing device(s) 12 to facilitate gameplay in a hosted gameplay configuration, other external resource(s), and/or provide other functionality attributed herein to computing device(s) 12. The one or more processor(s) 24 may further be programmed to receive the sensor information from the one or more sensors 18, 20, and/or 22, determine an orientation, motion, and/or position of the computing device based on the sensor information, and determine one or more visual effects to apply to the two-dimensional images based on the sensor information.

The processor(s) 24 may be programmed to apply the determined visual effects to a two-dimensional image. For example, the processor(s) 24 may update the GUI such that a visual effect is overlaid onto, incorporated with, or otherwise visually depicted in association with the two-dimensional image to give the two-dimensional image a three-dimensional appearance or other visual effect. In this manner, all or a portion of the virtual slot machine may be depicted to have a three-dimensional or other visual representation to provide a realistic representation of the virtual slot machine based on the applied visual effects.

In some implementations, the processor(s) 24 may be programmed to generate a new visual effect to be applied when the sensor information indicates that the orientation of the computing device 12 has changed since a previous visual effect was applied. In this manner, as the user playing the virtual slot machine game changes an orientation of the computing device 12, the processors may update the GUI with new or updated visual effects that are applied to the two-dimensional images. These new visual effects may simulate changes to the perspective views of a real-world slot machine that occur when the POV of a real-world user changes, thereby providing a more realistic user experience while playing the virtual slot machine game.

To provide a more realistic user experience, the processor(s) 24 may determine and apply different types of visual effects such as a three-dimensional effect, a holographic effect, and/or other effect that are applied to a two-dimensional image. The system 10 may generate a graphical user interface comprising a two-dimensional image in a slot machine game having a first three-dimensional effect based on a first orientation. The system 10 may receive sensor information that indicates a second orientation and/or any other orientation of the handheld computing device 12. The system 10 may determine a second three-dimensional effect to apply to the two-dimensional image based on the sensor information.

In some implementations, the two-dimensional image may correspond to: one or more reel cutouts, one or more symbols on one or more lines of a slot machine, one or more columns of a slot machine, one or more rows of a slot machine, the slot machine as a whole, and/or multiple elements on different lines of the slot machine which constitute a winning combination and/or any other combination in a slot machine.

One or more three-dimensional effects may be applied individually, and/or simultaneously to the two-dimensional image. The three dimensional effects may include light, shadow, reflection effects, and/or any other three dimensional effects to simulate a three-dimensional image. Additional effects may include holographic effects.

The shadow effect may include a simulated shadow that is cast by the two-dimensional image based on a virtual light source that provides a virtual light to the two-dimensional image and is fixed with respect to the two-dimensional image. The processor(s) 24 may determine a particular orientation of the computing device 12 and determine the simulated shadow based on the particular orientation. In this manner, the processor(s) 24 may apply different shadow effects to the two-dimensional image based on the orientation of the computing device 12 to simulate a different perspective of a real-world shadow cast by a real-world portion of a real-world slot machine as a POV of a user changes.

In some implementations, the first orientation may correspond to a first point of view with respect to the computing device 12 from a user's perspective. The second orientation may correspond to a second point of view with respect to the handheld computing device 12 from the user's perspective. The step of determining the second three-dimensional effect to apply to the two-dimensional image may be based on the second point of view and/or any other point of view.

Through the use of shadowing effects, the two-dimensional image may appear to be shifted to simulate content which appears virtually deeper in the device through a manipulation of the height and width of the shadowing effect. A given shadow effect may be associated with one or more shadow parameters that affect the appearance of the shadow effect. The shadow parameters may include, for example, a width, a length, a transparency (e.g., level of black or other shadow color), an overall shape, and/or other property of the shadow effect that affects its appearance. The processor may adjust one or more of the shadow parameters (to change the appearance of the shadow effect) based on the orientation of the computing device 12.

In some implementations, the data provided by a single type of sensor(s) 16 may directly correspond to the depth, width, overall shape and/or transparency of the shadow effect. In some implementations, a combination of one or more types of sensors (16) may directly correspond to the depth, width, overall shape and/or transparency of the shadow effect.

In some implementations, the virtual light source may cast a virtual light on a two dimensional image at a particular angle (e.g., at a 45 degree angle from a given side of the two dimensional image). For example, when the device is in a level orientation (e.g., the player is holding the device level with respect to the ground), a virtual light source that casts a virtual light on one side of the two dimensional image may result in a shadow effect that causes a virtual shadow to be displayed on the other side of the two dimensional image, thereby simulating a real-world light source that casts light onto an object from one side. As the device is tilted horizontally, the virtual reels or other two dimensional images that are in the lower level may appear to be moved horizontally in the opposite direction in order to portray a real lower panel. The computing device may be tilted in various degrees of freedom, such as along an x, y and/or z axis relative to a point on the computing device. In some implementations, if the player tilts the device to the right (i.e., rotating the front panel along the y axis, the lower panel content may appear shifted to the left in a manner which corresponds to the desired virtual depth. The virtual depth may be representative of the simulated three dimensional effects.

The reflection effect may include a reflection image that is displayed in association with a two dimensional image to give an appearance that the two dimensional image is reflecting the reflection image, creating a more realistic environment for a player. For example, the reflection image may include a portion of a virtual casino where the virtual slot machine is located. The portion of the virtual casino may be superimposed on a two dimensional image of the virtual slot machine to give the appearance that the two dimensional image is reflecting the portion of the virtual casino in a mirror-like manner. In some implementations, a given reflection effect may be associated with one or more reflection parameters that affect the appearance of the reflection effect.

The reflection parameters may include, for example, an image that is to be reflected (e.g., a "reflection"), an intensity of the reflection (e.g., a level of brightness of the reflection), a size of the reflection, whether the reflection should be skewed, a level of skewing, and/or other parameters that can be used to alter the appearance of the reflection image. In some implementations, the two-dimensional image that virtually reflects the reflection image may include a portion or all of what is displayed in the GUI. For example, a two-dimensional image may simulate a reflective frame of a reel cutout and/or the other features of the virtual slot machine and the GUI may display other portions of the virtual slot machine that does not virtually reflect the reflection image. In other examples, the two-dimensional image may encompass the entire viewing portion of the GUI such that the reflection image appears to be reflected by the entire viewing portion. Such reflections may be altered based on the angle and/or with rotation of the computing device 12 along one or more axes of rotation. In some implementations, the reflection image may be reflected on a portion of the GUI when tilted in one direction, and the reflection image may be reflected on only a portion of the GUI (e.g., the simulated frame) when the computing device 12 is tilted in another different direction.

In some implementations, different two-dimensional images may be associated with different reflective effects. Each of these different reflective effects may be controlled using corresponding reflection parameters. As such, a given reflection effect may be associated with its own intensity, color, etc., which may be different than another reflection effect that is displayed along with the given reflection effect.

Generally, the appearance of real-world slot machines may be based on the use of highly reflective surfaces (e.g., a gold foil frame around each reel cutout). This reflective surface may reflect the lights in its real-world environment. In some implementations, to simulate this effect, computing devices (12) may super-impose onto or otherwise display in association with a virtual surface (e.g., a two-dimensional image) of the virtual slot machine an image of a portion of a casino and/or other environment. In this manner, the virtual surface is given an appearance that it is reflecting the portion of the casino and/or other environment).

The holographic effect may simulate certain holographic treatments that are applied to real-world slot machines. Such holographic treatments can include "flakes," or iridescent portions that may change in color depending on a viewing angle. The holographic effect may include virtual flakes to simulate such treatments. In some implementations, a holographic effect may be associated with one or more holographic parameters that affect an appearance of the holographic effect. The holographic parameters may include, for example, a number of flakes to display, a density of the flakes to display, an intensity of brightness of an individual flake, a shape of an individual flake, a size of an individual flake, and/or any other parameters that can alter the appearance of the holographic effect.

Processor(s) 24 may be configured to provide information processing capabilities in computing device(s). As such, processor(s) 24 may include one or more of a digital processor, an analog processor, a digital circuit designed to process information, an analog circuit designed to process information, a state machine, and/or other mechanisms for electronically processing information. Although processor(s) 24 is shown in FIG. 1 as a single entity, this is for illustrative purposes only. In some implementations, processor(s) 24 may include a plurality of processing units. These processing units may be physically located within the same device, or processor(s) 24 may represent processing functionality of a plurality of devices operating in coordination.

The processor(s) 24 may be configured to execute one or more game instructions (e.g., game software 26), operating system instructions, and/or other instructions. Processor(s) 24 may be configured to execute instructions by software; hardware; firmware; some combination of software, hardware, and/or firmware; and/or other mechanisms for configuring processing capabilities on processor(s) 24. As used herein, the term "instructions" may refer to any component or set of components that perform the functionality attributed to the instructions. This may include one or more physical processors during execution of processor readable instructions, the processor readable instructions, circuitry, hardware, storage media, or any other components.

Computing device(s) 12 may be coupled to one or more game server(s) (not illustrated in FIG. 1) in a hosted gameplay configuration. The one or more game server(s) may be configured to execute one or more computer program instructions. The computer program instructions may include one or more game instructions (e.g., game software 26 executing on game server(s), and/or other instructions.

The game software 26 may be configured to execute an instance of the slot machine game. The system 10 may comprise user instructions configured to access and/or manage one or more player profiles and/or player information associated with players of the system 10. The one or more player profiles and/or player information may include information stored by game server(s), one or more of the computing device(s) 12, and/or other storage locations. The player profiles may include, for example, information identifying players (e.g., a player name or handle, a number, an identifier, and/or other identifying information) within the virtual space, security login information (e.g., a login code or password), virtual space account information, subscription information, virtual currency account information (e.g., related to currency held in credit for a player), relationship information (e.g., information related to relationships between players in the virtual space), virtual space usage information, demographic information associated with players, interaction history among players in the virtual space, information stated by players, purchase information of players, browsing history of players, a computing device identification associated with a player, a phone number associated with a player, and/or other information related to players.

The user instructions may be configured to store inventories of virtual items including resources that are available to players in the virtual space. Various matters may be collected in an inventory. These matters may include, but are not limited to, virtual items, virtual resources, character attributes, character skills, and/or virtual currency.

Players within the game may acquire virtual currency. In such games, the virtual currency might be represented by virtual coins, virtual cash, or by a number or value stored by the server for that player's benefit. Such virtual currency may represent units of value for use as consideration in transactions in the online game system 10, and/or may be analogous to legal currency. Virtual currency can be purchased for real money consideration. Such purchases may be made for cash or credit denominated in real money, made be made for another virtual currency previously purchased by a player for real money (e.g., Facebook credits, Bitcoins, and/or other virtual currency). A player may earn virtual currency by taking action in the game. For example, a player may be rewarded with one or more units of virtual currency after completing a task, quest, challenge, or mission within the game. For example, a slot machine game might reward 10 gold coins each time the player completes a bonus game.

Virtual currency may be used to purchase one or more in-game assets or other benefits. For example, a player may be able to exchange virtual currency for a desired level, access, right, or item in an online game. In some implementations, legal currency can be used to directly purchase an in-game asset or other benefit. The player can select the desired in-game asset or other benefit. Once the necessary selections are made, the player can place the order to purchase the in-game asset or other benefit. This order is received by the game system 10, which can then process the order. If the order is processed successfully, an appropriate financial account associated with the player can be debited by the amount of virtual currency or legal currency needed to buy the selected in-game asset or other benefit.

Multiple types of virtual currency may be available for purchase from the game system 10 operator. For example, an online game may have virtual gold coins and virtual cash. The different types of virtual currency may have different exchange rates with respect to legal currency and each other. For example, a player may be able to exchange $1 (or other legal currency) in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. Virtual cash may be awarded for leveling up in the game.

The game software 26 may be configured to execute a game instance of a game space. The game software may facilitate participation of the players in an online game that takes place in the game space by effectuating performance of operations in the instance of the game space in response to commands received from the players. The operations may comprise operations of a first operation type, wherein the outcome of operations of the first operation type are determined stochastically or quasi-stochastically based on one or more outcome probabilities for the first operation type, and wherein the players include a first player and/or any other player. In some implementations, the game may include chance-based gameplay, such as random player selection, random automatic selection, dice, wheel spinning, roulette, spinning tops, card drawing, lottery, blackjack, slots, keno, poker, mini-game, battle outcomes, loot drop outcomes, and/or any other chance-based games.

In an outcome of the game, a given player may engage in the gameplay provided by the game to win one or more of the potential awards. For determining an outcome of the game, the game software 26 may be configured to stochastically or quasi-stochastically select one of the potential awards as an actual award for distribution to the given player as a result of the gameplay engaged in by the given player based on the award probabilities with the potential awards. In some examples, the gameplay provided by the secondary game may include chance-based gameplay, such as random player selection, random automatic selection, dice, wheel spinning, roulette, spinning tops, card drawing, lottery, and/or any other chance-based gameplays. In some implementations, an outcome may be a determination of a reward for performing some action within the online game. For example, upon completing a level, defeating a non-player character, defeating a player opponent, and/or other actions in the game, a reward outcome may be stochastically or quasi-stochastically determined. This may include selecting a reward from among a set of potential rewards. The individual potential awards may be associated with outcome probabilities. Stochastic or quasi-stochastic selection of one of the potential rewards as the reward in accordance with the outcome probabilities.

The game software 26 may be configured to implement the instance of the virtual space executed by the computer instructions to determine state of the virtual space. The state may then be communicated (e.g., via streaming visual data, via object/position data, and/or other state information) from server(s) to computing device(s) 12 for presentation to players. The state determined and transmitted to a given computing device(s) 12 may correspond to a view for a player character being controlled by a player via the given computing device(s) 12. The state determined and transmitted to a given computing device(s) 12 may correspond to a location in the virtual space. The view described by the state for the given computing device may correspond, for example, to the location from which the view is taken, the location the view depicts, and/or other locations, a zoom ratio, a dimensionality of objects, a point-of-view, and/or view parameters of the view. One or more of the view parameters may be selectable by the player.

The instance of the virtual space may comprise a simulated space that is accessible by players via clients (e.g., computing device(s) 12) that present the views of the virtual space to a player. The simulated space may have a topography, express ongoing real-time interaction by one or more players, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer instructions may be synchronous, asynchronous, and/or semi-synchronous.

The above description of the manner in which state of the virtual space is determined by game software 26 is not intended to be limiting. The game software 26 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game software 26, players may control characters, objects, simulated physical phenomena (e.g., wind, rain, earthquakes, and/or other phenomena), and/or other elements within the virtual space to interact with the virtual space and/or each other. As used herein, the term "player character" may refer to an object (or group of objects) present in the virtual space that represents an individual player. The player character may be controlled by the player with which it is associated. The player controlled element(s) may move through and interact with the virtual space (e.g., non-player characters in the virtual space, other objects in the virtual space). The player controlled elements controlled by and/or associated with a given player may be created and/or customized by the given player. The player may have an "inventory" of virtual goods and/or currency that the player can use (e.g., by manipulation of a player character or other player controlled element, and/or other items) within the virtual space.

The players may participate in the instance of the virtual space by controlling one or more of the available player controlled elements in the virtual space. Control may be exercised through control inputs and/or commands input by the players through computing device(s) 12. The players may interact with each other through communications exchanged within the virtual space. Such communications may include one or more of textual chat, instant messages, private messages, voice communications, and/or other communications. Communications may be received and entered by the players via their respective computing device(s) 12. Communications may be routed to and from the appropriate players through server(s) (e.g., through game software 26).

The purchase instructions may be configured to facilitate purchases by players of content for use within the online game and/or any other game. In some implementations, players within the game can acquire content in the form of virtual currency, virtual goods, virtual items, and/or other content. In such games, virtual currency might be represented by virtual coins, virtual cash, by a number or value stored by the server for that player's benefit, and/or through other representations. Such virtual currency represents units of value for use in the online game system 10, and is analogous to legal currency. The content may be purchased through exchange of consideration having real money value. Such consideration may include one or more of real money (e.g., through a credit/debit/charge card transaction, through an ACH transaction, and/or other real money transactions), a virtual currency purchased with real money (e.g., FaceBook® Credits, Microsoft™ Points, and/or other virtual currency), and/or other consideration having real money value.

In some implementations, players may purchase content in the form of item instances of virtual items. The virtual items may include a first virtual item and/or any other item. A virtual item may be an item that can be used in the game instance by the player. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, game tokens, gaming chips, and/or other items.

The potential awards may include premium items highly sought after in the online game, items that may be used to augment and/or enhance other items, such as items rewarded by the events within the online game, improvements to one or more player parameters, virtual services (e.g., enhanced graphics of the online game provided to the players), and/or any other awards that may be provided through the game. The individual potential awards for the game may be pre-determined by the provider, administrator, moderator, and/or any other entities related to the online game at a configuration stage of the system 10. Simultaneously or alternatively, the individual potential awards may be determined dynamically during the instance of the online by the provider, administrator, moderator, and/or any other entities related to online game. In some examples, the potential awards of the game may be dynamically determined based on one or more items rewarded by events in the online game. In some implementations, players may be rewarded with one or more units of virtual currency after completing a task, quest, challenge, or mission within the game.

Electronic storage 28 may comprise non-transitory storage media that electronically stores information. The electronic storage media of electronic storage 28 may include one or both of system 10 storage that is provided integrally (i.e., substantially non-removable) with game server(s) and/or removable storage that is removably connectable to game server(s) via, for example, a port (e.g., a USB port, a firewire port, etc.) or a drive (e.g., a disk drive, etc.). Electronic storage 28 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 28 may include one or more virtual storage resources (e.g., cloud storage, a virtual private network, and/or other virtual storage resources). Electronic storage 28 may store software algorithms, information determined by processor(s) 16, information received from game server(s), information received from computing device(s) 12, and/or other information that enables game server(s) to function as described herein.

Input(s) 30 may be used for spatial control of a computing system 10, and may have a significant impact on capabilities of the computer system 10 and a user's overall experience. There are several types of input devices. The most common of these for personal computers include single-pointer, indirect interaction devices, such as a mouse or trackpad, and direct interaction devices, such as touchscreens.

In some implementations, computing device(s) 12 may be coupled to one or more game server(s) (not illustrated in FIG. 1) in a hosted gameplay configuration. The one or more game server(s) may be configured to execute one or more computer program instructions. The computer program instructions may include one or more game instructions (e.g., game software 26) executing on game server(s), and/or other instructions. The game server(s) may host a game space in which an online game takes place. The game server(s) may be configured to communicate with one or more computing device(s) 12 according to a client/server architecture. The players may access system 10 and/or the virtual space via computing device(s) 12. As such, game server(s) may be programmed to perform at least some of the functions of computing device(s) 12.

The network instructions of the game server(s) may be configured to maintain a connection to the one or more computing device(s) 12. For example, the network instructions may maintain one or more communication lines or ports to enable connection and/or exchange of information with a network and/or other computing platform(s) 12. Information such as state information, game state and game logic may be communicated via network instructions. The network instructions may be configured to receive information from the computing device(s) 12 as well.

External resource(s) may include sources of information, hosts and/or providers of virtual spaces outside of system 10, external entities participating with system 10, and/or other resources. In some implementations, some or all of the functionality attributed herein to external resource(s) may be provided by resources included in system 10.

The game server(s), computing device(s) 12, and/or external resource(s) may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game server(s), computing device(s) 12, and/or external resource(s) may be operatively linked via some other communication media.

Computing device(s) 12 may include electronic storage 28, one or more processors 24, and/or other components. Game server(s) may include communication lines, or ports to enable the exchange of information with a network and/or other computing platforms 12. Computing device(s) 12 may include a plurality of hardware, software, and/or firmware components operating together to provide the functionality attributed herein to game server(s). For example, game server(s) may be implemented by a cloud of computing platforms operating together as game server(s).

It should be appreciated that the description of the functionality provided by the different instructions one or more of user instructions, game software 26, sensor information instructions, graphical user interface instructions, three-dimensional information instructions, updating graphical user interface instructions, network instructions, and/or any other instructions described below is for illustrative purposes, and is not intended to be limiting, as any of the instructions may provide more or less functionality than is described. For example, one or more of instructions may be eliminated, and some or all of its functionality may be provided by other ones of instructions. As another example, processor(s) 24 may be configured to execute one or more additional instructions that may perform some or all of the functionality attributed below to one of instructions.

Figure 2:
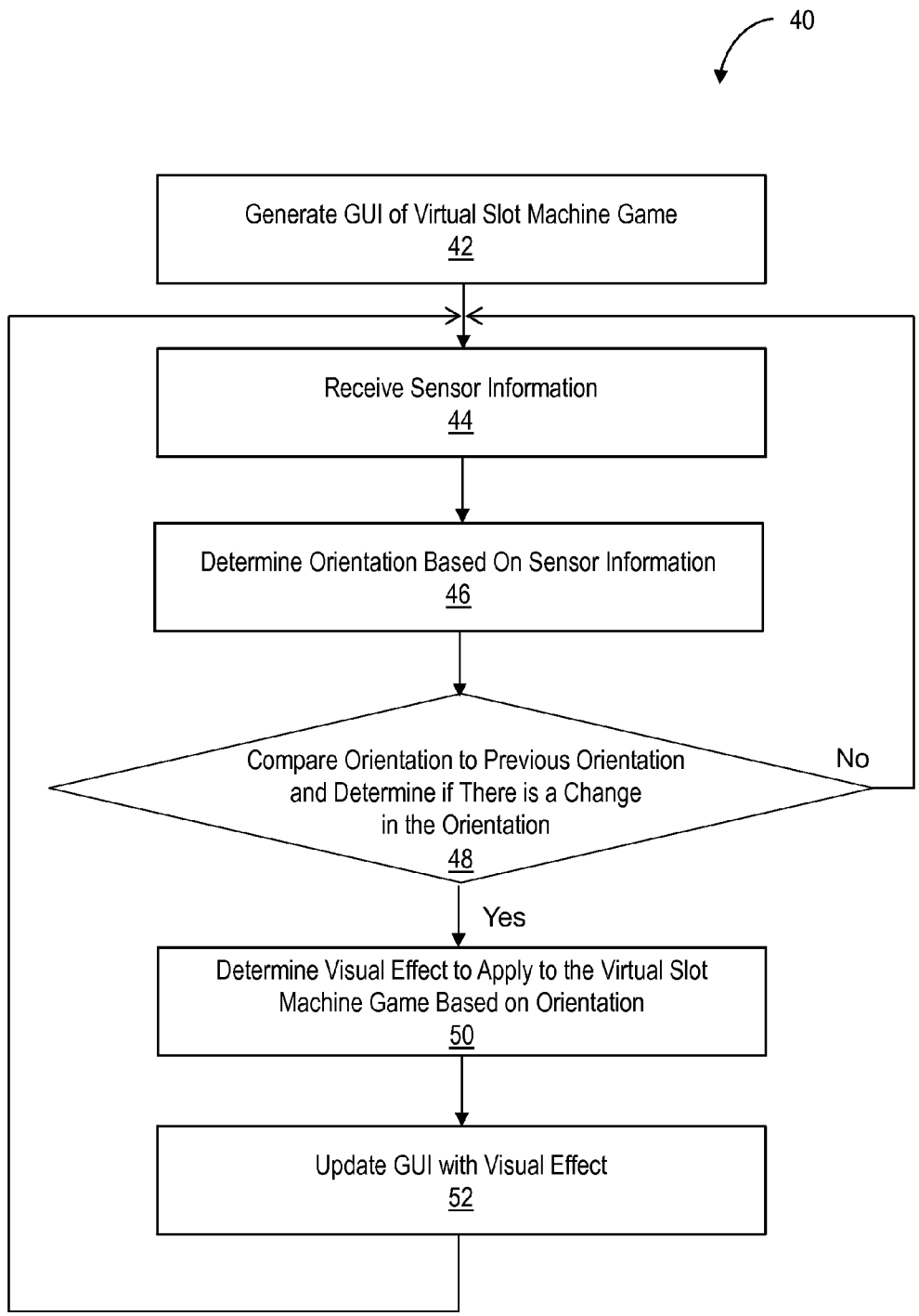
FIG. 2 illustrates an exemplary method of applying visual effects such as three-dimensional and holographic effects to two-dimensional images in a slot machine game rendered on a computing device based on sensor information that indicates an orientation of the computing device, according to an aspect of the invention.

FIG. 2 illustrates an exemplary method 40 of applying visual effects such as three-dimensional and holographic effects to two-dimensional images in a slot machine game rendered on a computing device 12 based on sensor information that indicates an orientation of the computing device 12, according to an aspect of the invention. The operations of method 40 presented below are intended to be illustrative. In some embodiments, method 40 may be accomplished with one or more additional operations not described, and/or without one or more of the operations discussed. The order in which the operations of method 40 are illustrated in FIG. 2 and described below is not intended to be limiting.

In some embodiments, method 40 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 40 in response to instructions stored electronically on an electronic storage medium. The one or more processing devices may include one or more devices configured through hardware, firmware, and/or software to be specifically designed for execution of one or more of the operations of method 40.

At an operation 42, a graphical user interface depicting all or a portion of a virtual slot machine may be generated. In some implementations, operation 42 may be performed by processor(s) the same as or similar to processor(s) 24 (shown in FIG. 1 and described above).

At an operation 44, sensor information may be received. In some implementations, the sensor information may be received from a gyroscope, accelerometer, and/or other sensor(s) the same as or similar to sensor(s) 16 (shown in FIG. 1 and described above).

At an operation 46, an orientation, motion, and/or position may be determined based on the sensor information. In some implementations, operation 46 may be performed by a processor(s) the same as or similar to processor(s) 24 (shown in FIG. 1 and described above).

At an operation 48, a comparison of the orientation, motion, and/or position to a previous orientation, motion, and/or position may be implemented, and a determination may be made to detect if there is a change in the orientation, motion, and/or position. In some implementations, operation 48 may be performed by a processor(s) the same as or similar to processor(s) 24 (shown in FIG. 1 and described above). If it is determined that there is no change, the process proceeds back to operation 44 as described above. If it is determined that there is a change in the orientation, motion, and/or position the process proceeds to operation 50.

At an operation 50, a visual effect to apply to a two-dimensional image displayed in the virtual slot machine game based on the orientation, motion, and/or position may be determined. In some implementations, operation 50 may be performed by a processor(s) the same as or similar to processor(s) 24 (shown in FIG. 1 and described above).

At an operation 52, the graphical user interface may be updated with the visual effect. For example, the visual effect may be overlaid onto, incorporated with, or otherwise displayed alongside a two-dimensional image to give the two-dimensional image an appearance of three-dimensional and/or other visual effect. In some implementations, operation 50 may be performed by a processor(s) and a display the same as or similar to processor(s) 24 and display 14 (shown in FIG. 1 and described above). The operation may then continue back to operation 44.

Figure 3:
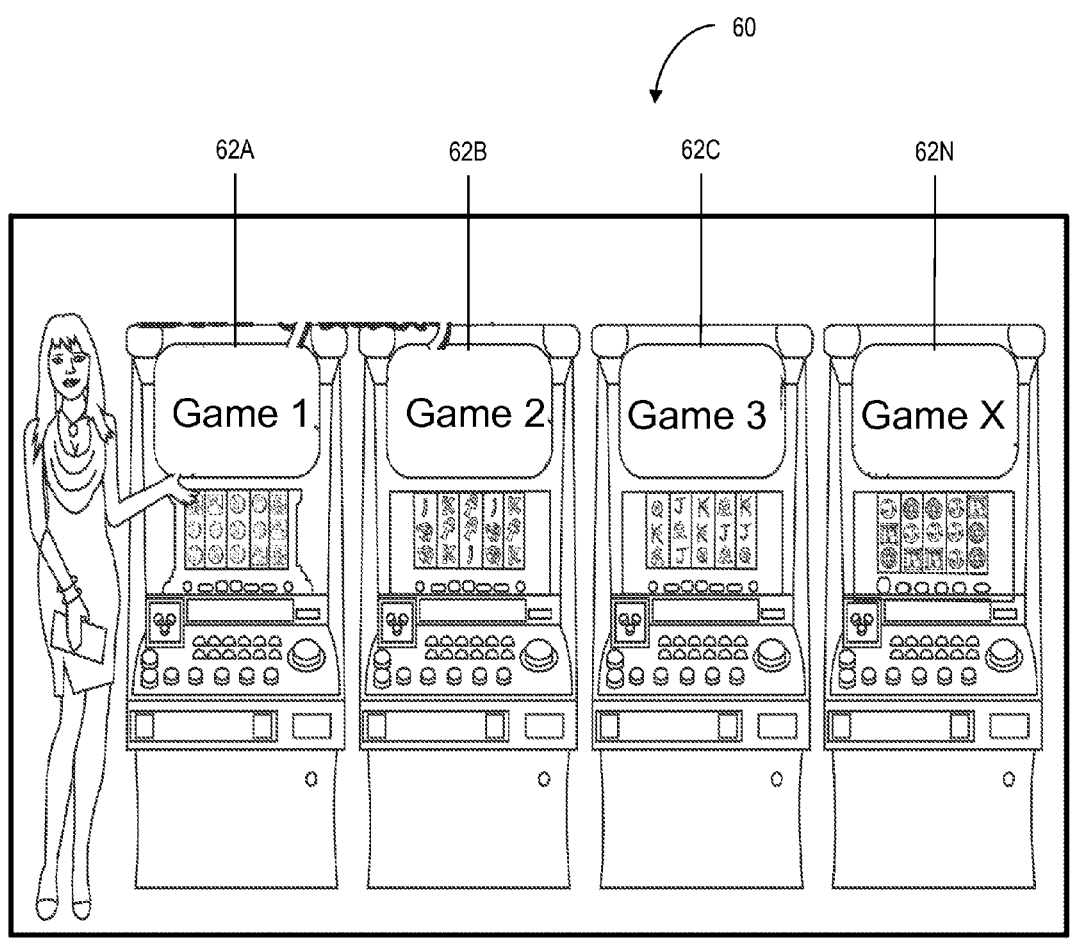
FIG. 3 illustrates an exemplary diagram of a user interface which allows players to select a particular game, according to an aspect of the invention.

FIG. 3 illustrates an exemplary diagram of a user interface 60 which allows players to select a particular game, according to an aspect of the invention. In some implementations, the player may be provided an option to select a particular slot machine game 62 (illustrated in FIG. 3 as slot machine game 62A, 62B, 62C, . . . , 62N) to play.

Figure 4A:
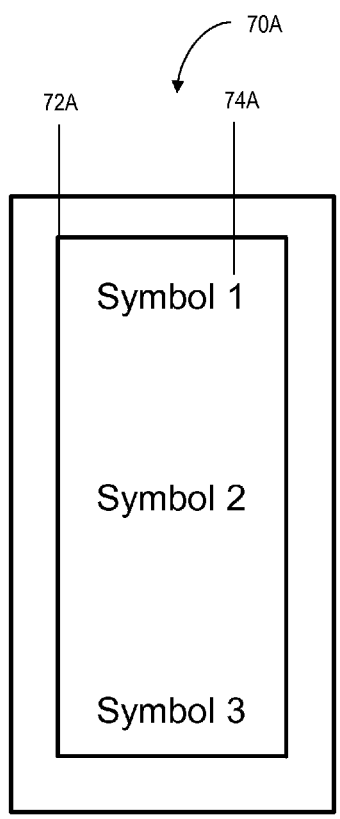
FIG. 4A illustrates an exemplary diagram of a user interface with two-dimensional images in a slot machine game rendered on a computing device, according to an aspect of the invention.

FIG. 4A illustrates an exemplary diagram of a user interface 70A with two-dimensional images in a slot machine game rendered on a computing device 12, according to an aspect of the invention. User interface 70A illustrates a two-dimensional image 74A (e.g., a standard reel) to which no three-dimensional effects have been applied.

Figure 4B:
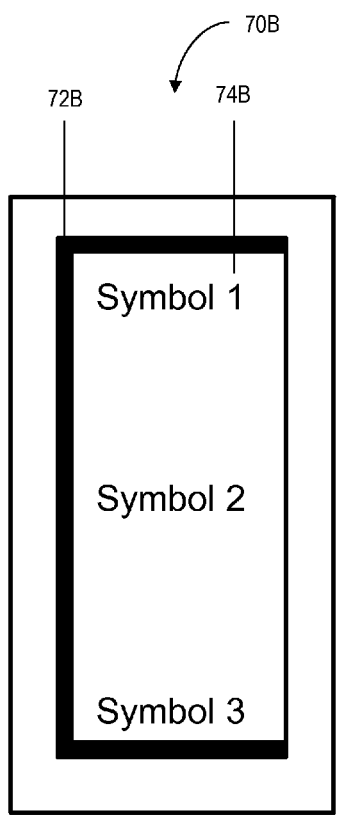
FIG. 4B illustrates an exemplary diagram of a user interface which applies visual effects such as three-dimensional and holographic effects to two-dimensional images in a slot machine game rendered on a computing device based on sensor information that indicates an orientation of the computing device, according to an aspect of the invention.

FIG. 4B illustrates an exemplary diagram of a user interface 70B which applies visual effects such as three-dimensional and holographic effects to two-dimensional images in a slot machine game rendered on a computing device 12 based on sensor information that indicates an orientation of the computing device 12, according to an aspect of the invention. User interface 70B illustrates a two-dimensional image 74B to which a visual effect 72B is applied. As illustrated in FIG. 4B, a virtual light source may impart a virtual light at a particular angle to a portion of two-dimensional image 74B. Visual effect 72B as illustrated may include a particular shadow effect. For example, if the player views the device straight on, there might be shadows 72B on the left hand side of the reels (as viewed by the player) depending on the orientation of the computing device 12. A given shadow effect may be associated with one or more shadow parameters that affect the appearance of the shadow effect. The shadow parameters may include, for example, a width, a length, a transparency, intensity (e.g., level of black or other shadow color), an overall shape, and/or other property of the shadow effect that affects its appearance. The processor may adjust one or more of the shadow parameters (to change the appearance of the shadow effect) based on the orientation of the computing device 12 to simulate changes in perception of a real-world light source as a player's POV changes.

Figure 4C:
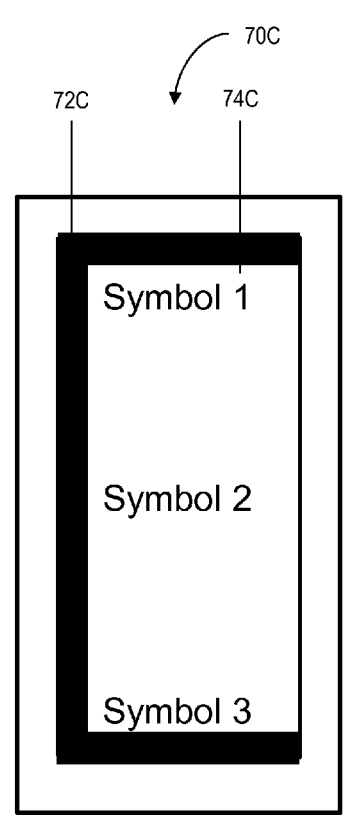
FIG. 4C illustrates an exemplary diagram of a user interface which applies visual effects such as three-dimensional and holographic effects to two-dimensional images in a slot machine game rendered on a computing device based on sensor information that indicates an orientation of the computing device, according to an aspect of the invention.

FIG. 4C illustrates an exemplary diagram of a user interface 70C which applies visual effects such as three-dimensional and holographic effects to two-dimensional images in a slot machine game rendered on a computing device 12 based on sensor information that indicates an orientation of the computing device 12, according to an aspect of the invention.

User interface 70C illustrates a two-dimensional image 74C to which a visual effect 72C is applied. For example, the visual effect 72C as illustrated includes a larger shadow effect than the visual effect 72B illustrated in FIG. 4B, which may be attributable to differences in the orientation, motion, and/or position of computing device(s) 12 at the time that visual effects 72B and 72C were generated and applied to their respective two-dimensional images.

Figure 5:
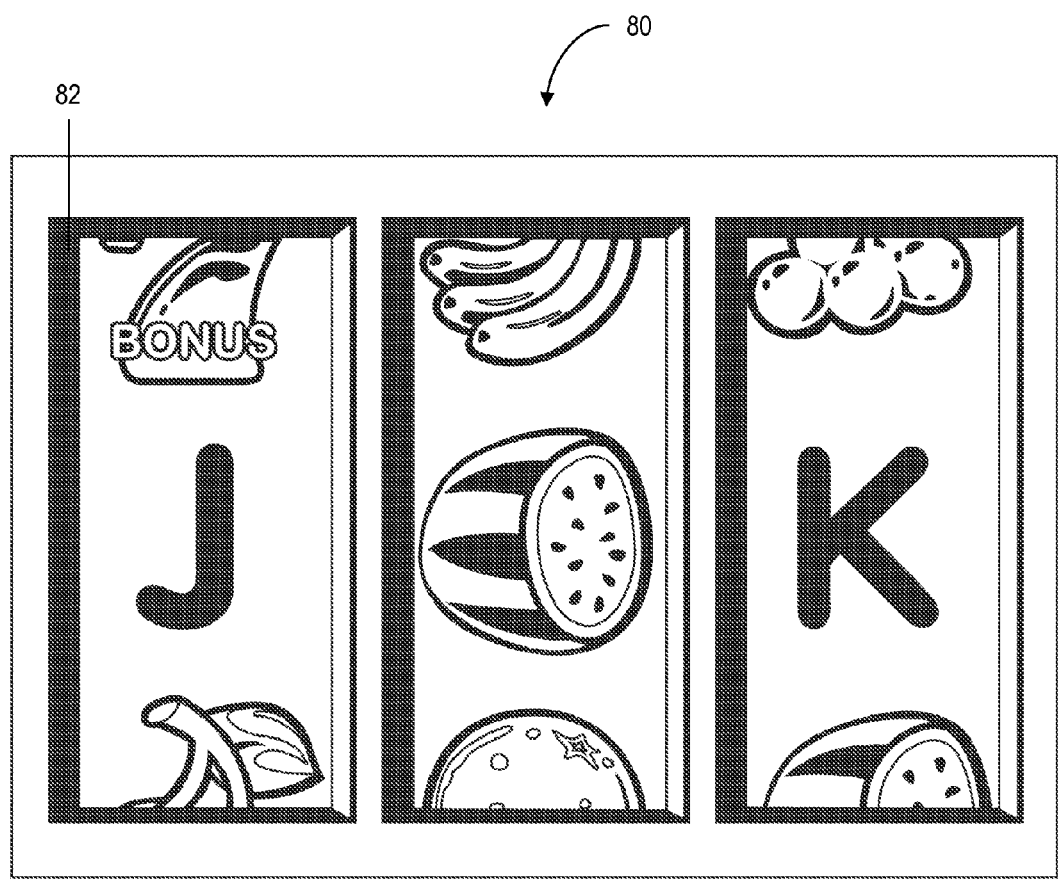
FIG. 5 illustrates an exemplary diagram of a user interface which applies visual effects such as three-dimensional and holographic effects to two-dimensional images in a slot machine game rendered on a computing device based on sensor information that indicates an orientation of the computing device, according to an aspect of the invention.

FIG. 5 illustrates an exemplary diagram of a user interface 80 which applies visual effects such as three-dimensional and holographic effects to two-dimensional images in a slot machine game rendered on a computing device 12 based on sensor information that indicates an orientation of the computing device 12, according to an aspect of the invention. The user interface 80 may depict the slot machine reels with the shadow effects 82 applied to the reels based on the orientation of the computing device 12.

Figure 6:
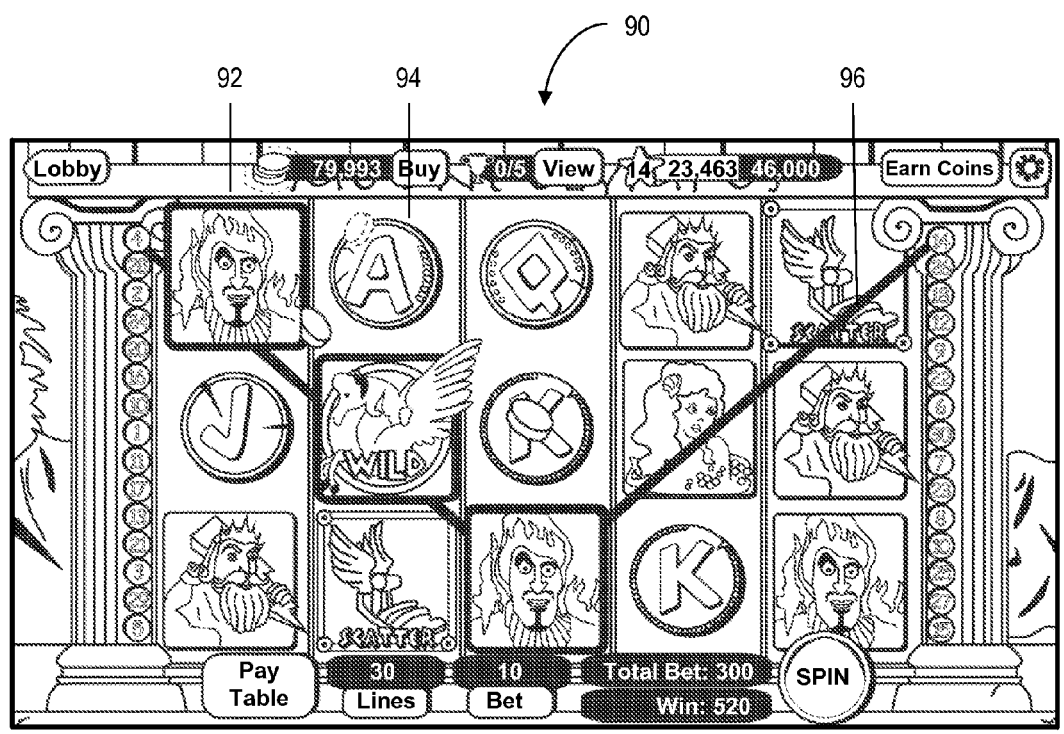
FIG. 6 illustrates an exemplary diagram of a user interface which applies visual effects such as three-dimensional and holographic effects to two-dimensional images including any combination of elements and/or paylines in a slot machine game rendered on a computing device based on sensor information that indicates an orientation of the computing device, according to an aspect of the invention.

FIG. 6 illustrates an exemplary diagram of a user interface 90 which applies visual effects such as three-dimensional and holographic effects to two-dimensional images including any combination of two-dimensional images and/or paylines in a slot machine game rendered on a computing device 12 based on sensor information that indicates an orientation of the computing device 12, according to an aspect of the invention. In some implementations, the user interface 90 may depict the slot machine reels with the shadow effects 92 applied to the winning symbols based on the orientation of the computing device 12. In some implementations, the user interface 90 may depict the slot machine reels with the shadow effects 94 applied to all the symbols based on the orientation of the computing device 12. In some implementations, the user interface 90 may depict the winning payline with the shadow effects 96 based on the orientation of the computing device 12. In some implementations, any combination of symbols, winning symbols, notifications, winning paylines, reels, notifications and/or any other two-dimensional images depicted on the user interface may have any combination of shadow effects, reflective effects, and/or holographic effects.

Figure 7:
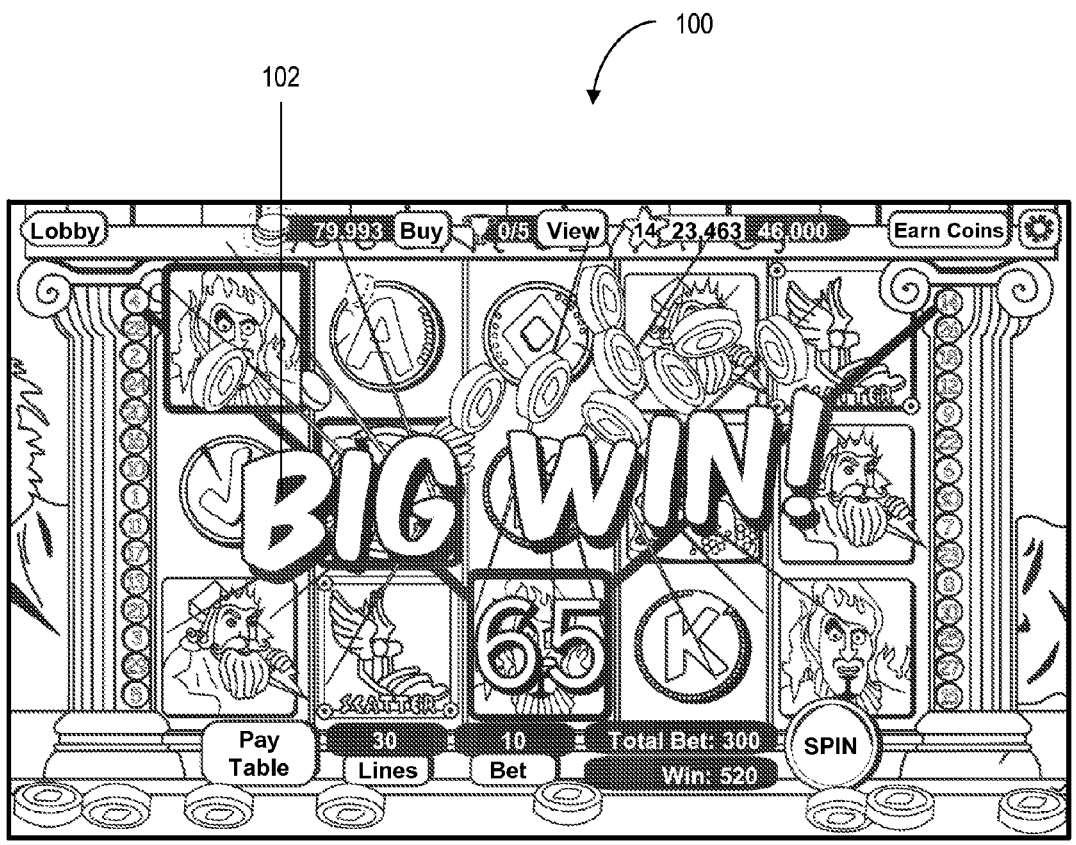
FIG. 7 illustrates an exemplary diagram of a user interface which applies visual effects such as three-dimensional and holographic effects to two-dimensional images including any notifications, elements and/or paylines in a slot machine game rendered on a computing device based on sensor information that indicates an orientation of the computing device, according to an aspect of the invention.

FIG. 7 illustrates an exemplary diagram of a user interface 100 which applies visual effects such as three-dimensional and holographic effects to two-dimensional images including any notifications, elements and/or paylines in a slot machine game rendered on a computing device 12 based on sensor information that indicates an orientation of the computing device 12, according to an aspect of the invention. The user interface 100 may depict the slot machine reels with the shadow effects 102 applied to the notification based on the orientation of the computing device 12.

Figure 8:
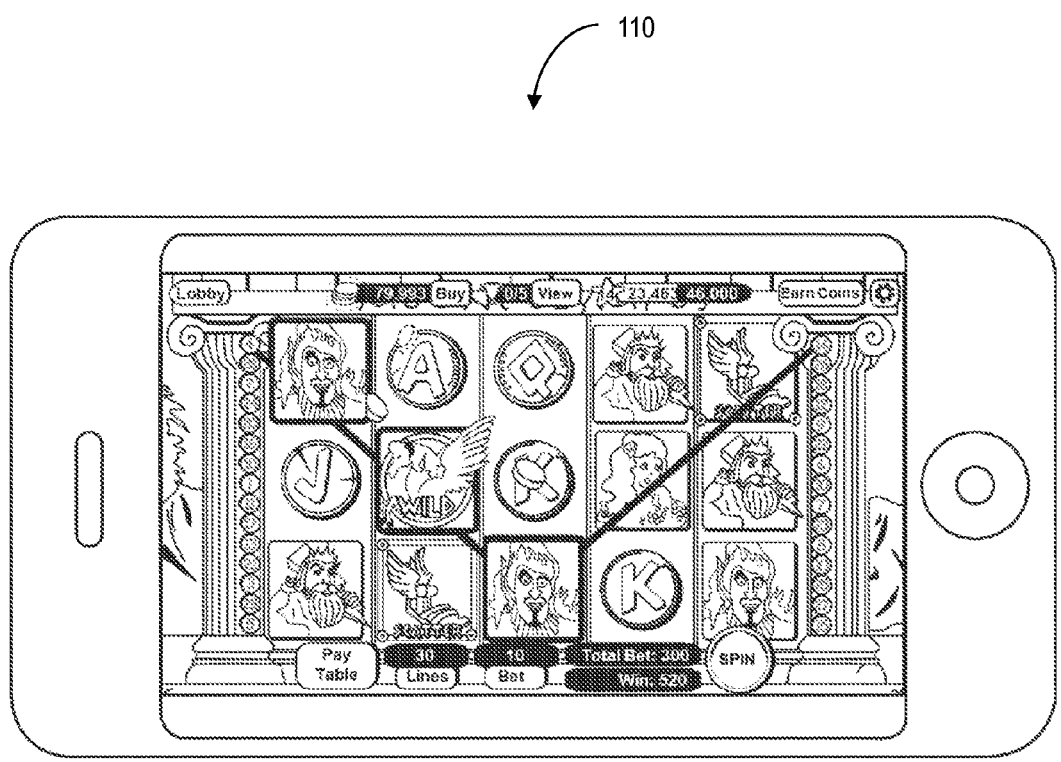
FIG. 8 illustrates an exemplary diagram of a computing device platform used to determine an orientation of the computing device, according to an aspect of the invention.

FIG. 8 illustrates an exemplary diagram of a computing device 12 platform 110 used to determine an orientation of the computing device 12, according to an aspect of the invention. There may be several platforms in which the game may be implemented. Some platforms may include hardware platforms, operating system 10 platforms and/or software platforms. In some implementations, hardware platform may include different types of systems in general (e.g., a handheld mobile phone as illustrated in FIG. 8).

Figure 9:
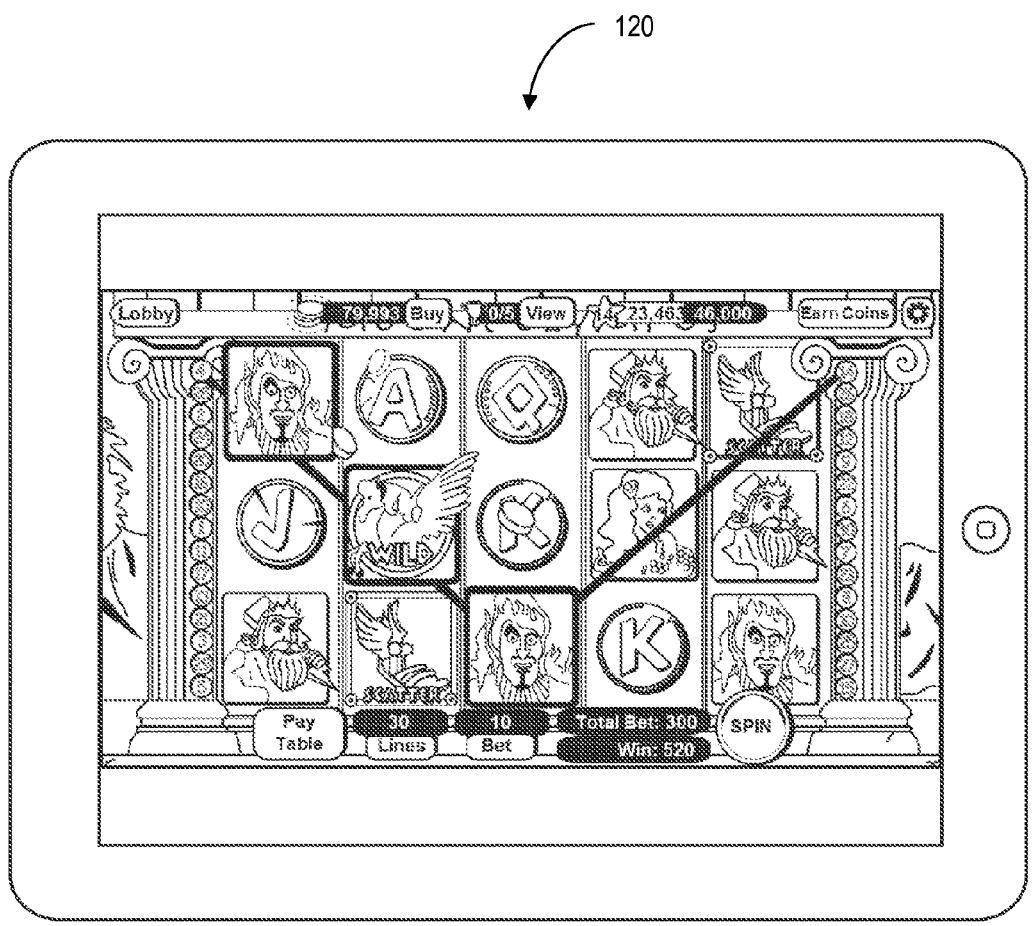
FIG. 9 illustrates an exemplary diagram of a computing device platform used to determine an orientation of the computing device, according to an aspect of the invention.

FIG. 9 illustrates an exemplary diagram of a computing device 12 platform 120 used to determine an orientation of the computing device 12, according to an aspect of the invention. In some implementations, hardware platform may include different types of systems in general (e.g., a handheld tablet as illustrated in FIG. 9).

It would be understood by one of ordinary skill in the art that the player interfaces may not be limited to the embodiment illustrated in FIGS. 3-9. The player interfaces may be associated with any objective, activity, action, or a combination thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for displaying two-dimensional slot machine images simulating three-dimensions in a slot machine game, the method being implemented on a handheld mobile device having one or more processors and one or more sensors, the method comprising:
receiving sensor information that indicates a first orientation of the handheld mobile device;
providing a graphical user interface comprising a two-dimensional image in a virtual slot machine game having a first three-dimensional effect through a first visual effect based on the first orientation, the first visual effect comprising a first reflection effect which reflects a first casino environment;
receiving sensor information that indicates a second orientation of the handheld mobile device;
determining a second three-dimensional effect to apply to the two-dimensional image through a second visual effect based on the sensor information; and updating the graphical user interface to apply the second three-dimensional effect to the two-dimensional image;
wherein the first reflection effect comprises one or more portions of the virtual casino superimposed on a virtual slot machine giving the appearance that the virtual slot machine is reflecting one or more portions of the virtual casino in a mirror-like manner with one or more reflection parameters, the one or more reflection parameters including one or more of an image that is to be reflected, an intensity of the reflection, a level of brightness of the reflection, a size of the reflection, or a level of skewing of the reflection.

2. The method of claim 1, wherein the first visual effect comprises a first lighting effect and a first shadowing effect, and the second visual effect comprises a second lighting effect and a second shadowing effect.

3. The method of claim 2, wherein the first orientation corresponds to a first point of view with respect to the handheld mobile device from a user's perspective and the second orientation corresponds to a second point of view with respect to the handheld mobile device from the user's perspective and the step of determining the second three-dimensional effect to apply to the two-dimensional image through the second lighting effect and the second shadowing effect is based on the second point of view.

4. The method of claim 2, wherein the two-dimensional image corresponds to one or more symbols on one or more lines of a virtual representation of a slot machine.

5. The method of claim 2, wherein the two-dimensional image corresponds to one or more columns of a slot machine.

6. The method of claim 2, wherein the two-dimensional image corresponds to one or more rows of a slot machine.

7. The method of claim 2, wherein the two-dimensional image corresponds to the slot machine as a whole.

8. The method of claim 2, wherein the two-dimensional image corresponds to multiple elements on different lines of the slot machine which constitute a winning combination.

9. The method of claim 1, wherein the second visual effect comprises a second reflection effect which reflects a second casino environment, the first casino environment comprising a first portion of a virtual casino and the second casino environment comprising a second portion of the virtual casino.

10. The method of claim 1, wherein the first visual effect comprises a first holographic effect which reflects a first holographic flake paint, and the second visual effect comprises a second holographic effect which reflects a second holographic flake paint.

11. The method of claim 1, wherein the first visual effect comprises one or more of: a first lighting effect, a first shadowing effect, a first reflection effect, or a first holographic effect.

12. The method of claim 1, wherein the second visual effect comprises one or more of: a second lighting effect, a second shadowing effect, a second reflection effect, or a second holographic effect.

13. The method of claim 12, wherein the second shadowing effect reduces a thickness of a shadow.

14. The method of claim 12, wherein the second shadowing effect increases a thickness of a shadow.

15. A method for displaying two-dimensional slot machine images simulating three-dimensions in a slot machine game, the method being implemented on a handheld mobile device having one or more processors and one or more sensors, the method comprising:

receiving sensor information that indicates a first orientation of the handheld mobile device;

providing a graphical user interface comprising a two-dimensional image in a slot machine game having a first three-dimensional effect through a first holographic effect based on the first orientation, the first three-dimensional effect comprising a first reflection effect which reflects a first casino environment;

receiving sensor information that indicates a second orientation of the handheld mobile device;

determining a second three-dimensional effect to apply to the two-dimensional image through a second holographic effect based on the sensor information; and updating the graphical user interface to apply the second three-dimensional effect to the two-dimensional image;

wherein the first reflection effect comprises one or more portions of the virtual casino superimposed on a virtual slot machine giving the appearance that the virtual slot machine is reflecting one or more portions of the virtual casino in a mirror-like manner with one or more reflection parameters, the one or more reflection parameters including one or more of an image that is to be reflected, an intensity of the reflection, a level of brightness of the reflection, a size of the reflection, or a level of skewing of the reflection.

16. The method of claim 15, wherein the first holographic effect reflects a first holographic flake paint, and the second holographic effect reflects a second holographic flake paint.

17. A system for displaying two-dimensional slot machine images simulating three-dimensions in a slot machine game, the system being implemented on a handheld mobile device having one or more processors and one or more sensors, the system comprising:

one or more processors programmed by computer program instructions which when executed are configured to:

receive sensor information that indicates a first orientation of the handheld mobile device;

provide a graphical user interface comprising a two-dimensional image in a virtual slot machine game having a first three-dimensional effect through a first visual effect based on the first orientation, the first visual effect comprising a first reflection effect which reflects a first casino environment;

receive sensor information that indicates a second orientation of the handheld mobile device;

determine a second three-dimensional effect to apply to the two-dimensional image through a second visual effect based on the sensor information; and update the graphical user interface to apply the second three-dimensional effect to the two-dimensional image;

wherein the first reflection effect comprises one or more portions of the virtual casino superimposed on a virtual slot machine giving the appearance that the virtual slot machine is reflecting one or more portions of the virtual casino in a mirror-like manner with one or more reflection parameters, the one or more reflection parameters including one or more of an image that is to be reflected, an intensity of the reflection, a level of brightness of the reflection, a size of the reflection, or a level of skewing of the reflection.

18. The system of claim 17, wherein the first visual effect comprises a first lighting effect and a first shadowing effect, and the second visual effect comprises a second lighting effect and a second shadowing effect.

19. A system for displaying two-dimensional slot machine images simulating three-dimensions in a slot machine game, the system being implemented on a handheld mobile device having one or more processors and one or more sensors, the system comprising:

one or more processors programmed by computer program instructions which when executed are configured to:

receive sensor information that indicates a first orientation of the handheld mobile device;

provide a graphical user interface comprising a two-dimensional image in a slot machine game having a first three-dimensional effect through a first holographic effect based on the first orientation, the first three-dimensional effect comprising a first reflection effect which reflects a first casino environment;

receive sensor information that indicates a second orientation of the handheld mobile device;

determine a second three-dimensional effect to apply to the two-dimensional image through a second holographic effect based on the sensor information; and update the graphical user interface to apply the second three-dimensional effect to the two-dimensional image;

wherein the first reflection effect comprises one or more portions of the virtual casino superimposed on a virtual slot machine giving the appearance that the virtual slot machine is reflecting one or more portions of the virtual casino in a mirror-like manner with one or more reflection parameters, the one or more reflection parameters including one or more of an image that is to be reflected, an intensity of the reflection, a level of brightness of the reflection, a size of the reflection, or a level of skewing of the reflection.

* * * * *